INDEXING DRIVE MECHANISM

Filed May 27, 1965 3 Sheets-Sheet 1

United States Patent Office 3,314,296
Patented Apr. 18, 1967

3,314,296

INDEXING DRIVE MECHANISM

Kendall Clark and Thomas J. Rajac, both of Poughkeepsie, N.Y., assignors to International Business Machines Corporation, Armonk, N.Y., a corporation of New York Filed May 27, 1965, Ser. No. 459,345
11 Claims. (Cl. 74—24)

This invention relates to an indexing drive mechanism which may be utilized to index a rotatable head in angular increments while simultaneously raising and lowering the head.

The present invention is particularly adapted to index the chip placement head of a machine as disclosed in copending application Ser. No. 459,179 filed May 27, 1965, concurrently herewith and entitled, "Chip Positioning Machine." In said application the disclosed head is provided with a plurality of radial arms each having a vacuum needle adapted to pick up a semiconductor chip, sense its orientation, reorient the chip, and place it upon a printed-circuit substrate.

Each of these operations occurs at a different station at which each needle arrives when the head is successively angularly indexed. When the needles arrive at the respective stations the head is lowered by the subject indexing drive mechanism to bring the chips into engagement with the operating devices, after which the head is again raised and angularly indexed.

Although the accuracy, precision and reliability of the subject invention renders it particularly suitable for indexing the chip placement head of a chip positioning machine as noted above and described in more detail in said copending application, it will be understood that the subject invention may also be utilized wherever it may be required to index an element in angular increments about an axis while reciprocating the element in a direction parallel to said axis.

The foregoing and other objects, features and advantages of the invention will be apparent from the following more particular description of a preferred embodiment of the invention, as illustrated in the accompanying drawings.

*Placement head indexing mechanism*

Figure 1:
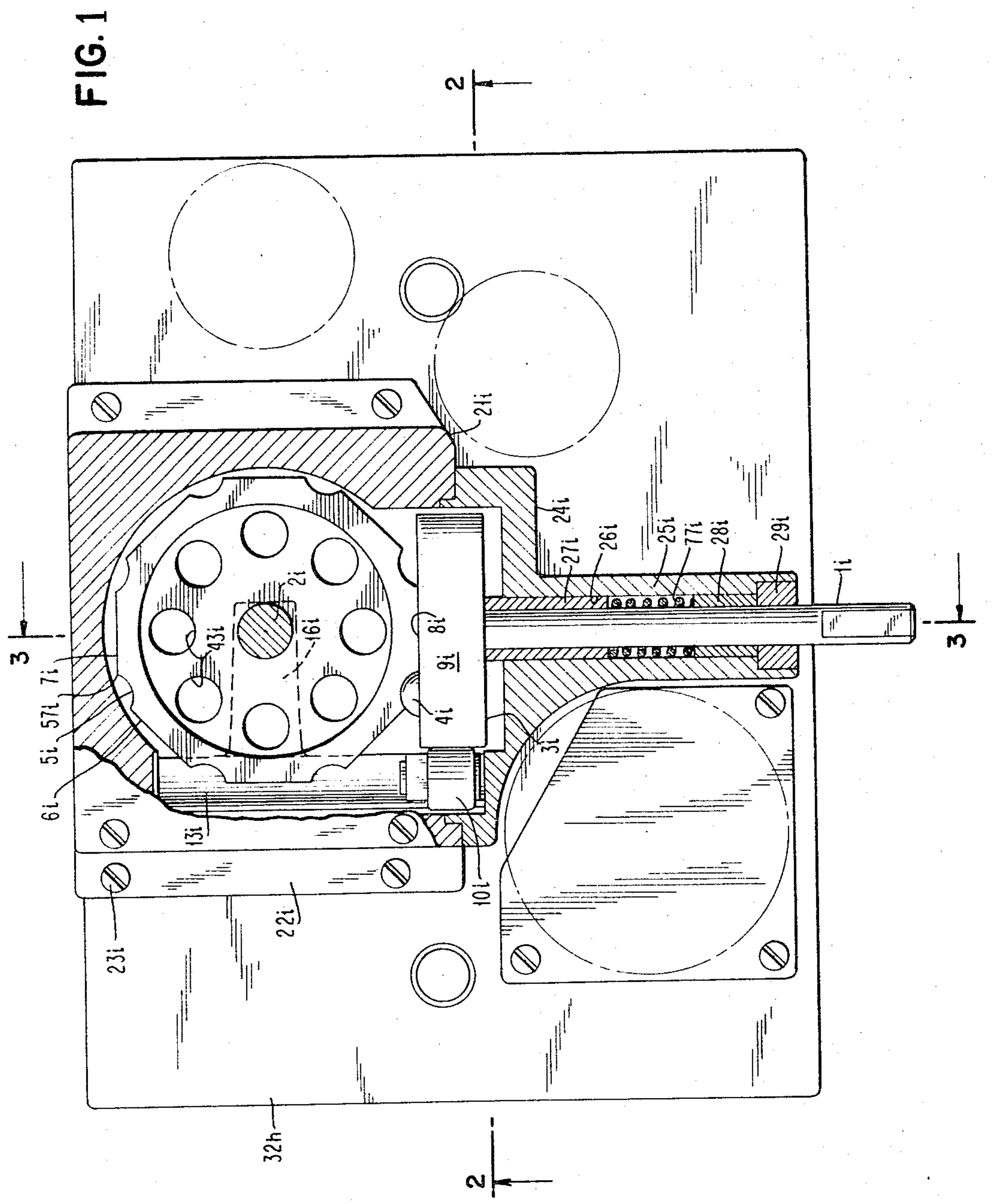
FIG. 1 is a horizontal sectional view of the indexing mechanism for the chip placement head.

The indexing mechanism which provides the above-described rotary and vertical movements of chip placement head spider 30*h* of the aforesaid copending application is shown in FIGS. 1 to 5 and will now be described. The indexing mechanism comprises an input shaft 1*i* and an output or spider shaft 2*i* to which said spider 30*h* is fixedly secured. A cam 3*i* is fixedly mounted to one end of input shaft 1*i* and is provided on its end face with an actuating pin 4*i* for drivingly engaging the semicylindrical grooves 5*i* formed in the periphery of an index plate 6*i* fixedly secured on the output spider shaft 2*i*.

Between each pair of adjacent grooves 5*i* the periphery of index plate 6*i* is formed with a flat surface 7*i* which is engaged by the planar end face 8*i* of cam 3*i* after each indexing movement to maintain spider 30*h* in the exact desired position. Input shaft 1*i* and cam 3*i* are axially movable in directions toward and away from index plate 6*i* to permit the latter to be rotatably indexed. Spring 77*i* urges input shaft 1*i* and cam 3*i* radially inwardly toward the axis of spider shaft 2*i* to maintain cam end face 8*i* in engagement with index plate 6*i*.

As input shaft 1*i* and cam 3*i* rotate, a semi-spherical actuating pin 4*i* enters the lower end of one of the grooves 5*i* and moves first upwardly and then downwardly therein to angularly displace index plate 6*i* and spider shaft 2*i* therewith through an angle of 45 degrees by the time pin 4*i* leaves the lower end of said groove 5*i*.

The vertical edge 57*i* at the intersection of the cylindrical surface of each groove 5*i* and the adjacent planar surface 7*i* is at a greater radial distance from the axis of shaft 2*i* than any other part of said surface 7*i*. Therefore as index plate 6*i* starts to rotate the trailing edge 57*i* of the engaged surface 7*i* pushes against cam face 8*i* to urge cam 3*i* and input shaft 1*i* in a direction radially outward from the axis of output shaft 2*i* so as to further compress spring 77*i*. The leading edge 57*i* of the next adjacent flat surface 7*i* again pushes against cam face 8*i* to urge cam 3*i* and input shaft 1*i* outwardly against the action of spring 77*i*. When said next adjacent flat surface 7*i* becomes parallel to cam face 8*i* spring 77*i* urges input shaft 1*i* and cam 3*i* toward index plate 6*i* to cause said cam face 8*i* to engage said next flat surface 7*i* on the periphery of index plate 6*i*. Index plate 6*i* and spider shaft 2*i* are thus maintained stationary in the proper angular position until actuating pin 4*i* engages the next adjacent groove 5*i* to repeat the rotary indexing motion.

The vertical motion of spider output shaft 2*i* is provided in the following manner. The periphery of cam 3*i* is provided with a cam surface 9*i* engaged by a cam follower 10*i* rotatably mounted on a follower shaft 11*i* projecting horizontally from the upper end of a vertical arm 12*i* having its lower end integral with a spider shaft vertical actuator indicated generally at 13*i*. The latter is provided at its opposite ends with coaxially-aligned bearing pins 14*i*, 15*i* for rotatable movement about the axis of the latter. Spider shaft vertical actuator 13*i* is further provided with a radially outwardly extending arm 16*i* having at its outer end a spherical recess 17*i* for seating a spherical ball 18*i* which engages the lower end of spider shaft 2*i*.

Figures 2, 3, 4:
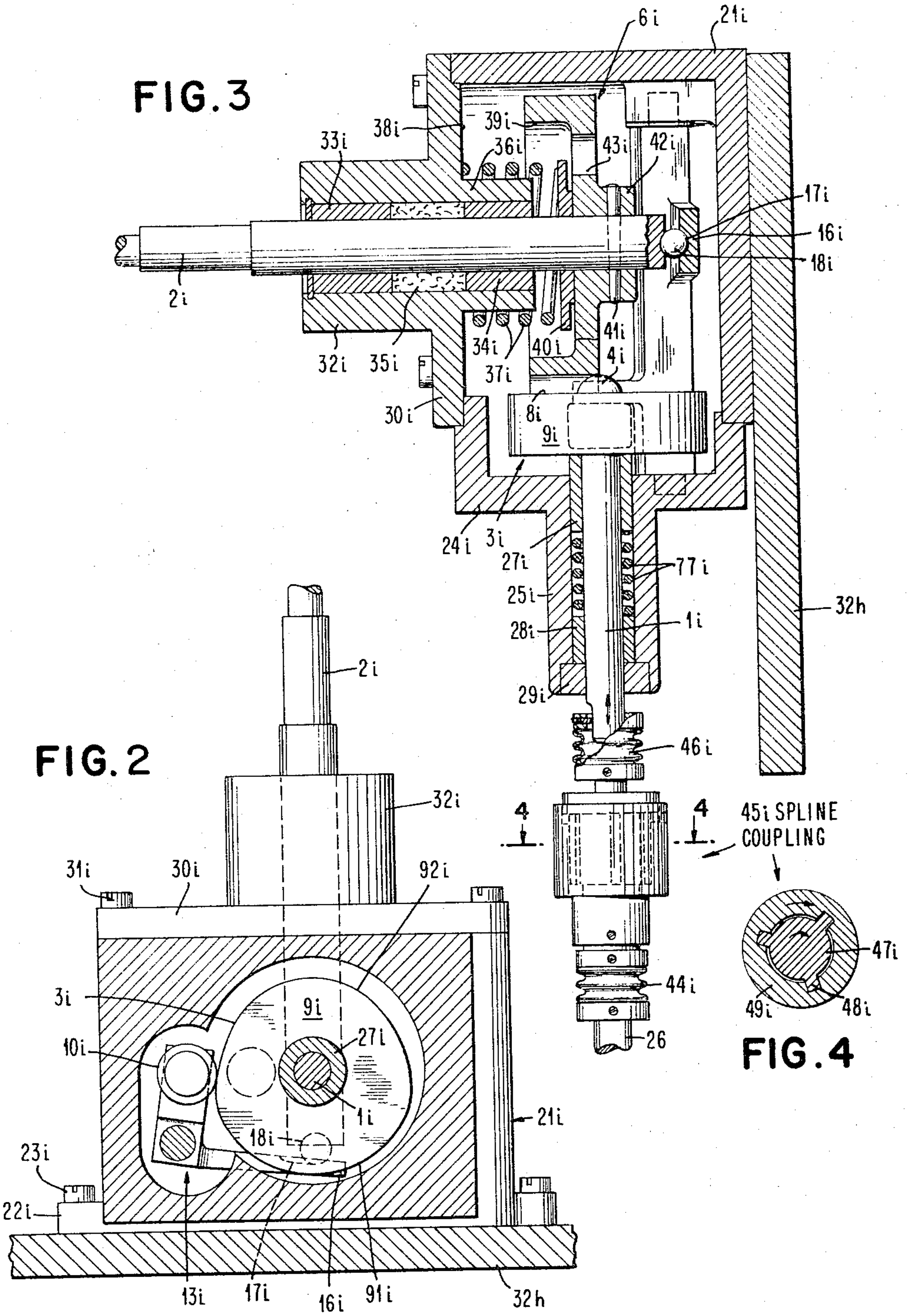
FIG. 2 is a vertical sectional view taken substantially on line 2—2 of FIG. 1.
FIG. 3 is a vertical sectional view taken substantially on line 3—3 of FIG. 1.
FIG. 4 is a transverse sectional view taken on line 4—4 of FIG. 3.
Figure 5:
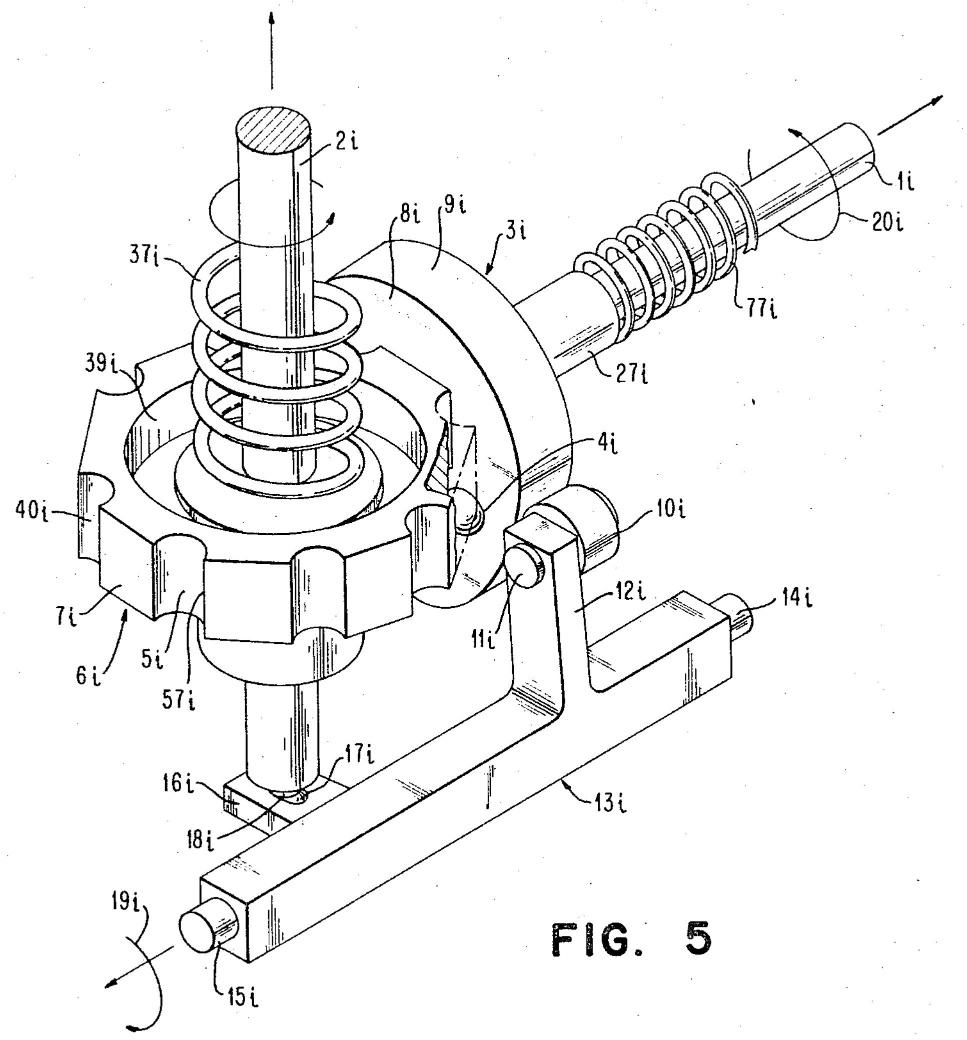
FIG. 5 is a schematic perspective view of the essential parts of the indexing mechanism with the housing and other details omitted for clarity in illustration.

As best seen in FIG. 2, cam surface 9*i* is provided with a rise portion 91*i* and a dwell portion 92*i*. As cam folfollower 10*i* approaches rise portion 91*i* spider shaft vertical actuator 31*i* is angularly displaced about the axis of bearing pins 14*i*, 15*i*, in the direction indicated by the arrow 19*i* thereby causing arm 16*i* to swing upwardly to raise spider shaft 2*i* and thereby provide the upward vertical movement of spider 30*h*. As input shaft 1*i* continues to rotate in the direction of the arrow 20*i*, cam follower 10*i* eventually approaches dwell portion 92*i* to permit spider shaft vertical actuator 13*i* to rotate about the axis of bearing pins 14*i*, 15*i* in the direction opposite to that of arrow 19*i*, thereby permitting arm 16*i* to swing downwardly so as to lower spider shaft 2*i* and thereby provide the required downward movement for spider 30*h*.

The indexing mechanism is enclosed within a housing indicated generally at 21*i* and provided with mounting lugs 22*i* secured by screws 23*i* to said base plate 32*h* of chip placement head. One lateral wall 24*i* of housing 21*i* is integrally formed with a horizontally extending cylindrical bearing enclosure 25*i* having an internal cylindrical bore 26*i* therethrough. Mounted within the latter are a pair of axially spaced tubular bearing sleeves 27*i*, 28*i* within which input shaft 1*i* is rotatably mounted. The outer end of bearing enclosure 25*i* has an end plate 29*i* fixedly mounted therein and provided with an opening through which input shaft 1*i* extends outwardly. The outer end of bearing sleeve 28*i* abutts against the inner end face of plate 29*i* to limit the outward axial movement of sleeve 28*i*. The inner end of sleeve 28*i* bears against the outer end of said spring 7*i* which has its inner end abutting against the outer end of the other sleeve 27*i*. The inner end of the latter engages cam 3*i*. It will thus be seen that spring 7*i* is under compression to urge sleeve 27*i* inwardly against cam 3*i* thereby urging both input shaft 1*i* and cam 3*i* inwardly to maintain end face 8*i* of cam 3*i* in engagement with the periphery of index plate 6*i*.

Housing 21*i* further comprises a top plate 30*i* secured by screws 31*i* and integrally formed with an upwardly projecting cylindrical bearing housing 32*i* having therein a conventional bearing means including sleeves 33*i*, 34*i* and packing 35*i* for mounting spider shaft 2*i* for both rotary and vertical reciprocal movement.

Housing 32*i* is formed with an integral cylindrical portion 36*i* extending downwardly from top plate 30*i*. A compression spring 37*i* has its upper end surrounding said portion 36*i* and in abutment against the lower surface 38*i* of top plate 30*i*. The lower end of spring 37*i* extends within a cylindrical recess 39*i* formed in index plate 6*i* and engages an abutment element 40*i* to urge index plate 6*i* together with spider shaft 2*i* downwardly and thereby maintain the lower end of spider shaft in engagewith ball 18*i* on the seat 17*i* formed in arm 16*i*.

Spider shaft 2*i* is fixedly secured to index plate 6*i* by a pin 41*i* extending transversely through a hub portion 42*i* of index plate 6*i*. Index plate 6*i* is formed with a plurality of openings 43*i* to permit lubricating oil to flow therethrough.

Input shaft 1*i* is drivingly rotated by a conventional one-revolution clutch (such as element 31 shown in FIG. 4 of the aforesaid copending application) through said shaft 26 which is coupled to shaft 1*i* by a first flexible bellows coupling 44*i* (FIG. 3), a spline coupling 45*i* and a second bellows coupling 46*i*. As shown in FIG. 4, spline coupling 45*i* is conventionally constructed and comprises an inner male element having spline 48*i* to permit nonrotatable sliding motion within an outer female element 49*i*.

What is claimed is:

1. An indexing drive mechanism comprising:
a rotatable and axially movable input shaft,
a member secured to said shaft,
a rotatable and axially movable output shaft,
an index plate secured to said output shaft,
said member having drive means to intermittently engage and drive said index plate to angularly displace the latter and said output shaft in response to rotation of said input shaft,
bias means for said input shaft for yieldably urging said member into abutment with said index plate to restrain movement of said index plate during disengagement of said drive means therewith, and
actuator means operatively connected to said output shaft and said input shaft for axial movement thereof in response to rotation of said input shaft.

2. An indexing drive mechanism comprising:
a rotatable axially movable input shaft,
a member operatively connected to said shaft,
a rotatable and axially reciprocal output shaft,
an index plate operatively connected to said output shaft,
said member having drive means to intermittently engage and drive said index plate to rotatably displace the latter and said output shaft in response to rotation of said input shaft, bias means for yieldably urging said member into abutment with said index plate to restrain movement of said index plate during disengagement of said drive means therewith, an actuator for said output shaft,
means rotatably mounting said actuator for oscillatory movement,
means responsive to oscillation of said actuator for axially reciprocating said output shaft, and
means engaging said member for oscillating said actuator in response to rotation of said input shaft.

3. An indexing drive mechanism comprising:
a rotatable and axially movable input shaft,
a cam secured to said shaft,
a rotatable and reciprocal output shaft having an extension transverse said input shaft with the axes of said input and output shafts disposed in substantially a common plane,
an index plate secured to said output shaft, bias means for yieldably urging said cam against said index plates to restrain movement thereof,
said cam having drive means to intermittently engage and drive said index plate to angularly displace the latter and said output shaft in response to rotation of said input shaft,
said cam including hold means for maintaining said index plate stationary during disengagement of said drive means from said index plate, and
actuator means operatively connected to said cam and to said output shaft for axial reciprocation thereof in response to the rotation of said input shaft.

4. An indexing drive mechanism comprising:
a rotatable input shaft,
a cam secured to said shaft,
a rotatable and vertically reciprocal output shaft,
an index plate secured to said output shaft and having a peripheral surface formed with a series of grooves alternating with a series of flat surfaces,
said cam having a planar end face adapted to engage said flat surfaces in succession to maintain said index plate stationary in proper alignment when the input shaft is stationary and a detent to drivingly engage said grooves in succession to angularly displace said index plate and said output shaft in response to rotation of said input shaft, bias means for urging said cam into yieldable engagement against said index plate,
a vertical actuator for said output shaft,
means mounting said actuator for oscillatory movement about a horizontal axis,
means responsive to oscillation of said actuator for vertically reciprocating said output shaft, and
cam follower means engaging said cam for oscillating said actuator in response to rotation of said input shaft.

5. An indexing drive mechanism comprising:
an input shaft, means rotatably mounting said shaft,
a cam secured to said shaft,
an output shaft, means mounting said output shaft for rotary and axially reciprocal movements,
an index plate secured to said output shaft and having a peripheral surface formed with a series of longitudinal grooves extending parallel to the axis of said output shaft and alternating with a series of flat surfaces,
said cam having planar end face adapted to engage said flat surfaces in succession to maintain said index plate stationary in proper alignment when the input shaft is stationary,
said cam having a detent to drivingly engage said grooves in succession to angularly displace said index plate and said output shaft a predetermined angular increment in response to rotation of said input shaft,
spring means resiliently urging said cam into engagement with said index plate,
an actuator for said output shaft,
and means rotatably mounting said actuator for oscillatory movement, said actuator having an arm engaging said output shaft for vertically reciprocating said output shaft in response to oscillation of said actuator, and
said actuator having cam follower means engaging said cam for oscillating said actuator in response to rotation of said input shaft.

6. An indexing mechanism comprising:
an input shaft, means rotatably mounting said shaft,
a cam secured to said shaft,
an output shaft, means mounting said output shaft for rotary and axially reciprocal movements,
an index plate secured to said output shaft and having a peripheral surface formed with a series of flat surfaces,
said cam having planar end face adapted to engage said flat surfaces in succession to maintain said index plate stationary in proper alignment when the input shaft is stationary,
said cam having means to angularly displace said index plate and said output shaft a predetermined angular increment in response to rotation of said input shaft,
spring means resiliently urging said cam into engagement with said index plate,
an axial actuator for said output shaft,
and means rotatably mounting said actuator for oscillatory movement,
said actuator having an arm engaging said output shaft for vertically reciprocating said output shaft in response to oscillation of said actuator, and
said actuator having cam follower means engaging said cam for oscillating said actuator in response to rotation of said input shaft.

7. An indexing mechanism comprising:
a rotatable input shaft,
a cam secured to said shaft,
a rotatable and reciprocal output shaft,
an index plate secured to said output shaft and having a peripheral surface formed with a series of grooves alternating with a series of flat surfaces,
said cam having a planar end face adapted to engage said flat surfaces in succession to maintain said index plate stationary in proper alignment when the input shaft is stationary and a detent to drivingly engage said grooves in succession to angularly displace said index plate and said output shaft in response to rotation of said input shaft,
spring means resiliently urging said cam into engagement with said index plate,
actuator for said output shaft,
means mounting said actuator for oscillatory movement about a horizontal axis,
means responsive to oscillation of said actuator for vertically reciprocating said output shaft, and
cam follower means engaging said cam for oscillating said actuator in response to rotation of said input shaft.

8. An indexing mechanism comprising:
an input shaft, means rotatably mounting said shaft,
a cam secured to said shaft,
an output shaft, means mounting said output shaft for rotary and axially reciprocal movements,
an index plate secured to said output shaft and having a peripheral surface formed with a series of longitudinal grooves extending parallel to the axis of said output shaft,
said cam having means to maintain said index plate stationary in proper alignment when the input shaft is stationary,
said cam having a detent to drivingly engage said grooves in succession to angularly displace said index plate and said output shaft a predetermined angular increment in response to rotation of said input shaft,
spring means resiliently urging said cam into engagement with said index plate, an actuator for said output shaft,
and means rotatably mounting said actuator for oscillatory movement,
said actuator having an arm engaging said output shaft for vertically reciprocating said output shaft in response to oscillation of said actuator, and
said actuator having cam follower means engaging said cam for oscillating said actuator in response to rotation of said input shaft.

9. An indexing mechanism comprising:
a rotatable input shaft,
a cam secured to said shaft,
a rotatable and vertically reciprocal output shaft,
an index plate secured to said output shaft and having a series of flat surfaces,
said cam having a planar end face adapted to engage said flat surfaces in succession to maintain said index plate stationary in proper alignment when the input shaft is stationary and having means to angularly displace said index plate and said output shaft in response to rotation of said input shaft, bias means for urging said cam into yieldable engagement against said index plate,
a vertical actuator for said output shaft,
means mounting said actuator for oscillatory movement about a horizontal axis,
means responsive to oscillation of said actuator for vertically reciprocating said output shaft,
and cam follower means engaging said cam for oscillating said actuator in response to rotation of said input shaft.

10. An indexing drive mechanism comprising:
a rotatably and axially movable vertical output shaft;
a rotatable and axially movable input shaft;
an index plate secured to said output shaft and having a peripheral surface formed with a series of grooves alternating with a series of flat surfaces;
a drive member secured to said input shaft and comprising (a) a drive means for intermittently engaging said grooves in succession to angularly displace said index plate and (b) a planar end face adapted to engage said flat surfaces to maintain said index plate stationary during disengagement of said drive means from said grooves;
bias means for yieldably urging said drive member into engagement with said peripheral surface of said index plate;
and actuator means for reciprocably moving said output shaft axially in response to rotation of said input shaft.

11. An indexing drive mechanism comprising:
a rotatable and axially movable output shaft;
bias for yieldably urging said output shaft in a first direction along the axis thereof;
an index means secured to said output shaft and having a peripheral surface thereof comprised of a series of flat surfaces defining a polygonal cross section, of said index means, transverse said output shaft;
a rotatable input shaft having an extension substantially normal to said output shaft with the axes of said input and output shafts disposed in substantially a common plane;
a rotatable drive member having one of a pair of opposite faces thereof operatively connected for rotation to and transverse an end of said input shaft with said drive member adapted for movement along the axis of said input shaft, and said drive member comprising a cam adapted to rotate about the axis of said input shaft;
a drive means on said drive member for intermittently engaging and driving said index means to rotatably displace the latter and said output shaft in response to the rotation of said input shaft;
a second bias means for yieldably urging the other of said faces of said drive member into abutment with said periphery of said index means whereby said second bias means is adapted to abut the said face with one of said flat surfaces during disengagement of said drive means from said index means; and actuator means operatively connected between said cam and said output shaft for intermittent axial movement thereof against the first said bias means in a direction opposite said first direction.

References Cited by the Examiner

UNITED STATES PATENTS

| | | | |
|---|---|---|---|
| 286,225 | 10/1883 | Richards ------------ | 74—24 |
| 2,315,411 | 3/1943 | Flood. | |

MILTON KAUFMAN, *Primary Examiner.*

FRED C. MATTERN, *Examiner.*

D. H. THIEL, *Assistant Examiner.*

UNITED STATES PATENT OFFICE

CERTIFICATE OF CORRECTION

Patent No. 3,314,296 April 18, 1967

Kendall Clark et al.

It is hereby certified that error appears in the above numbered patent requiring correction and that the said Letters Patent should read as corrected below.

Column 6, line 53, after "bias" insert -- means --; column 7, line 3, before "face" insert -- other --.

Signed and sealed this 14th day of November 1967.

(SEAL)
Attest:

Edward M. Fletcher, Jr.
Attesting Officer

EDWARD J. BRENNER
Commissioner of Patents